United States Patent [19]

Logie et al.

[11] 4,422,098

[45] Dec. 20, 1983

[54] INTERNAL TEST METHOD AND APPARATUS FOR FACSIMILE TRANSCEIVER

[75] Inventors: James A. Logie, Orlando; Arthur G. Wilson, Maitland, both of Fla.

[73] Assignee: Exxon Research and Engineering Co., Florham Park, N.J.

[21] Appl. No.: 316,949

[22] Filed: Oct. 30, 1981

Related U.S. Application Data

[63] Continuation of Ser. No. 120,488, Feb. 11, 1980.

[51] Int. Cl.³ .......................... H04N 1/42; H04N 1/02
[52] U.S. Cl. ..................................... 358/256; 358/286
[58] Field of Search ................. 358/78, 139, 256, 260, 358/263, 280, 281, 286, 257, 903

[56] References Cited

U.S. PATENT DOCUMENTS

| | | | |
|---|---|---|---|
| 3,598,910 | 8/1971 | Johnston et al. | 358/286 |
| 3,751,582 | 8/1973 | Wernikoff et al. | 358/903 |
| 3,906,154 | 9/1975 | de Niet | 358/260 |
| 3,937,872 | 2/1976 | Kondo et al. | 358/256 |
| 4,071,855 | 1/1978 | Wilmer | 358/260 |

*Primary Examiner*—Joseph A. Orsino, Jr.
*Attorney, Agent, or Firm*—Norman L. Norris; Dale M. Heist

[57] ABSTRACT

Disclosed is a circuit for and method of testing a facsimile transceiver to determine whether it is operating properly. The method employed utilizes a document having a test pattern on a first portion thereof which is placed adjacent the read head of the transceiver. The reading means of the transceiver is energized and the test pattern is scanned. The output of the reading means, when the transceiver is being diagnosed, is directed to a digital memory and stored. Subsequently, the output of this memory is connected to the transmitter section and from there to the receiver section of the transceiver which is then energized to display the contents of the memory on a second portion of the document. In the preferred embodiment of the invention, the test pattern is located on a portion of a document which does not encompass the entire circumference of a rotating drum. The reading means of the transmitter section of the transceiver is energized during a portion of each drum revolution corresponding to the passage of the test pattern adjacent the read head and the modulation/demodulator and writing means are energized during a different portion of the same drum revolution.

8 Claims, 2 Drawing Figures

INTERNAL TEST METHOD AND APPARATUS FOR FACSIMILE TRANSCEIVER

This is a continuation of application Ser. No. 120,488, filed Feb. 11, 1980.

BACKGROUND OF THE INVENTION

This invention relates in general to facsimile systems and in particular, it relates to an internal self-diagnostic circuit for a facsimile transceiver and to a method of testing a facsimile transceiver.

Facsimile systems are systems in which light/dark variations in a document at one location may be detected by one transceiver and converted into amplitude modulated or frequency modulated signals for transmission to a transceiver at a remote location where these signals are translated back to light/dark variations on a document. Many factors may affect and degrade the copy quality at the remote location. Some degradation in copy quality may be due to difficulties with the transmission line and some may be due to malfunctions of either the near or the remote transceiver. Therefore, it is desirable for the user of a facsimile transceiver to determine whether degradation in copy quality is caused by his own transceiver or by external factors. It is also desirable for the user of a facsimile transceiver to periodically test his own transceiver regardless of whether copy degradation has been observed in order that routine maintenance may be performed if necessary. In view of these considerations, it is desirable to provide a facsimile transceiver with means for internal diagnosis which is sometimes referred to as a self test mode.

One such prior art internal diagnostic method and apparatus for a facsimile transceiver is disclosed in U.S. Pat. No. 3,937,872 to Kondo et al. In the method and apparatus employed by Kondo et al, both the transmitting and receiving sections of the facsimile transceiver and the reading and writing means are operated simultaneously and the intensity of the light source of the transmitting section is electively varied. The output of the receiving section is then observed for variations in intensity, the reading and writing means being spaced apart some distance from one another. A malfunction of the transceiver is then determined to be present if the light/dark variation produced by the write head does not track the intensity variation induced at the read head.

In another known prior art technique, transmitting and receiving sections of the facsimile transceiver are simultaneously energized with the reading and writing means also operated simultaneously and again being spaced apart by some distance. A document having a test pattern on only a portion thereof is then employed and the read head scans that portion of the document containing the test pattern while the write head (spaced apart therefrom) generates a copy of the test pattern on the same document.

Both of these prior art techniques suffer from the disadvantage that the reading and writing means of the transceiver are operative simultaneously. It has been found that electrical noise from the writing means may affect the reading means thus causing a source of copy degradation not found in a normal operation of the transceiver thus decreasing the validity of these internal diagonstic methods.

Moreover, both the known prior art techniques require the reading and writing means to be physically spaced apart from one another in order that a sufficiently large test pattern area may be read while being simultaneously displayed by the writing means. However, it is generally desirable to keep the design of the reading and writing means compact so as to minimize the overall size of the transceiver. However, when the reading and writing means are closely spaced, the aforementioned problem of electrical noise is magnified when both are activated simultaneously.

SUMMARY OF THE INVENTION

The present invention overcomes these disadvantages by providing an apparatus for and a method of internal diagnosis of a facsimile transceiver in which the reading means and writing means are not simultaneously energized. In accordance with the present invention, a document with the test pattern on only a portion thereof is scanned with a reading means and the light/dark variations from the test pattern are stored in a memory and subsequently retrieved and displayed via the writing means after some time delay. In this approach, the reading and writing means need not be activated simultaneously thus eliminating noise coupling. Moreover, the reading and writing means of the present invention need not be physically spaced apart thus allowing for a compact design.

In the peferred embodiment of the present invention, a document containing a test pattern on a portion thereof is placed on a rotating drum with the test pattern encompassing only a portion of the circumference of the drum. The document is scanned with the reading means during a portion of each drum revolution and the information which is detected is stored in a digital memory. The information is then retrieved from the memory and displayed by the writing means during the same drum revolution on a different portion of the document. Since the writing means is operative only after some time delay, and since the drum is rotating continuously, the test pattern is thus displayed by the writing means spaced apart from the original test pattern. Moreover, since only a small portion of the test pattern is stored in memory at any one time, memory requirements are modest.

BRIEF DESCRIPTION OF THE DRAWINGS

The present invention will be more fully described by reference to the accompanying drawing in which.

DETAILED DESCRIPTION OF THE INVENTION

Figure 1:
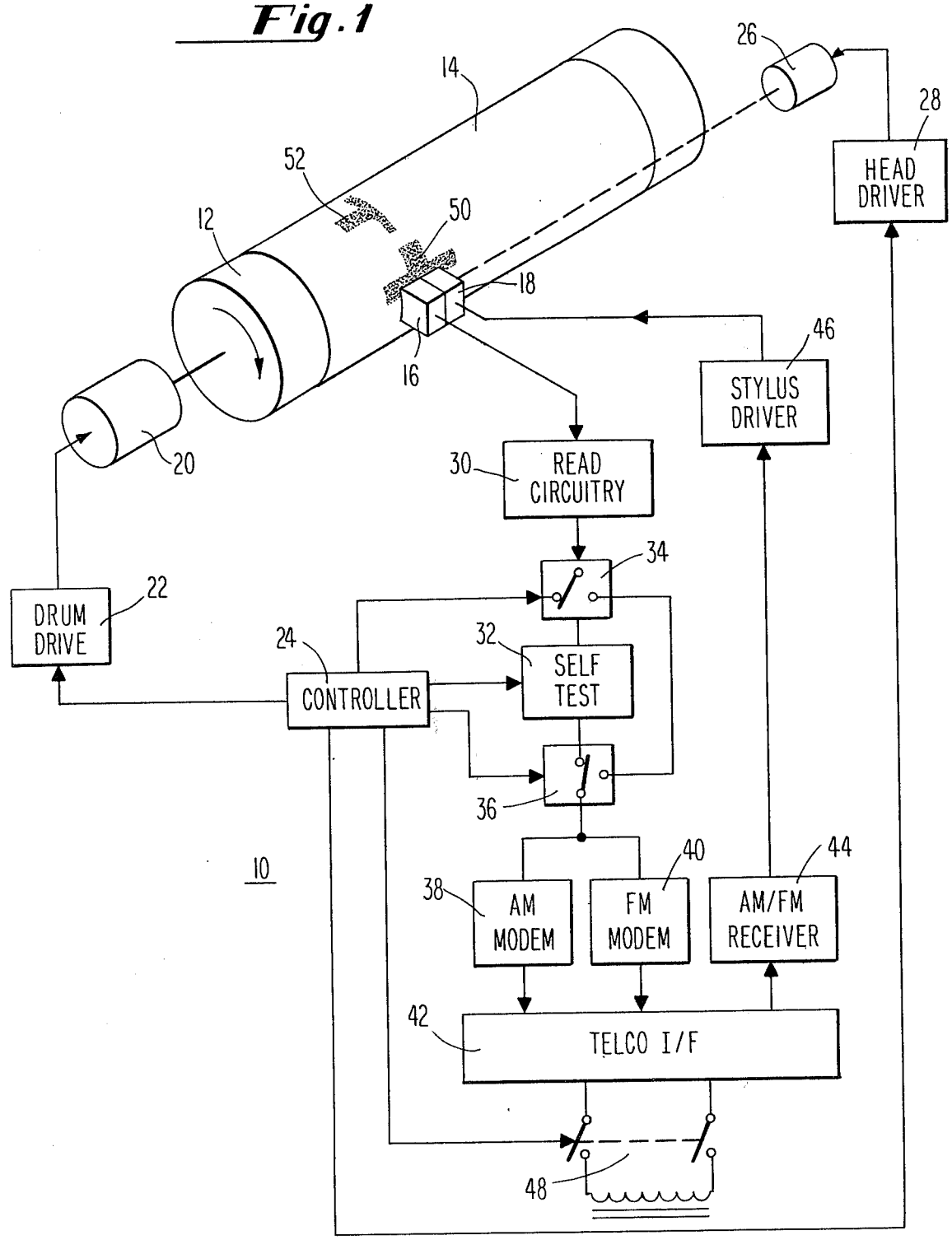
FIG. 1 is a block diagram of a facsimile transceiver including the internal diagonstic function of the present invention.

Referring first to FIG. 1, a facsimile transceiver is generally shown at 10. In the preferred embodiment, the transceiver 10 includes a revolving drum 12 upon which is placed a document 14 which is rotated past a head comprising a reading means 16 closely spaced adjacent to a writing means 18. The drum 12 is rotated by means of a drum drive motor 20 controlled by a drum dirve circuitry 22 under the control of a microprocessor controller 24. The reading means 16 and the writing means 18 are advanced along the axis of the drum by means of a head drive motor 26 which is controlled by head drive circuitry 28 which is also controlled by microprocessor controller 24.

When the transceiver 10 is operating in a transmit mode, video signals corresponding to light/dark variations on a document are detected by the reading means 16, and directed to the read circuitry 30. These video signals bypass the self test circuitry 32 of the present invention by means of a bypassing means comprised of switches 34 and 36. The video signals are directed to the transmitting means including AM modem 28 or FM modem 40 for transmission through telephone interface 42 to a remote transceiver (not shown).

When the transceiver 10 is in a receive mode, incoming video facsimile signals from the telephone network are directed from the telephone interface 42 to the receiver means of the transceiver 10 comprising AM/FM receiver 44 and from there to stylus driver circuit 46 and writing means 18. After being demodulated by the receiver 44, the signals are applied to the stylus drive circuit 46 from which they are directed to the writing means 18 where the signals are converted to light/dark variations on the paper 14 positioned on the rotating drum 12.

However, as shown in FIG. 1, when the transceiver 10 is operated in a self diagonstic mode, the controller 24 insures that switch 34 does not bypass the self test circuitry 32. The controller 24 also connects the output of self test circuit 32 to the transmitter means 38 or 40 and also disconnects the transceiver 10 from the telephone network by means of switching means 48. When a self diagnostic mode is selected, the receiver means 44, which is always connnected to the telephone line via the telephone interface, is connected to and activated simultaneously with the transmitter means.

As shown in FIG. 1, when operating in a self diagnostic or self test mode, a document such as 14 is utilized which employs a test pattern 50 on a first portion thereof which is positioned on drum 12. In accordance with the present invention, the test pattern 50 is confined to a portion of document 14 which does not encompass the entire circumference of the drum 12. In the preferred embodiment, the test pattern 50 is scanned line by line by the reading means 16. Information is sensed during a part of each revolution of drum 12 and is displayed by means of writing means 18 on another portion of document 14 as shown at 52 during a portion of the same drum revolution. Accordingly, a portion of each line of the document 14 is scanned by the reading means 16 before the sensed dark/light variations are applied to the transmitter and from the transmitter to the receiver means and displayed. The scanning of the test pattern 50 is repeated on a line-by-line basis, and the storing, retrieving and displaying of the sensed information is repeated on a line-by-line basis until the entire first portion of the document 14 containing the test pattern 50 has been scanned and displayed at 52.

While the preferred embodiment has been described in connection with a revolving drum type scanning mechanism, the present invention is also useful with other types of scanning mechanism such as a flat bed scanner. In such a scanner, it is desirable to scan the test pattern one line at a time before applying the dark/light variation to the transmitter means and to the receiver means and displaying the same in order that memory requirements may be minimized.

Figure 2:
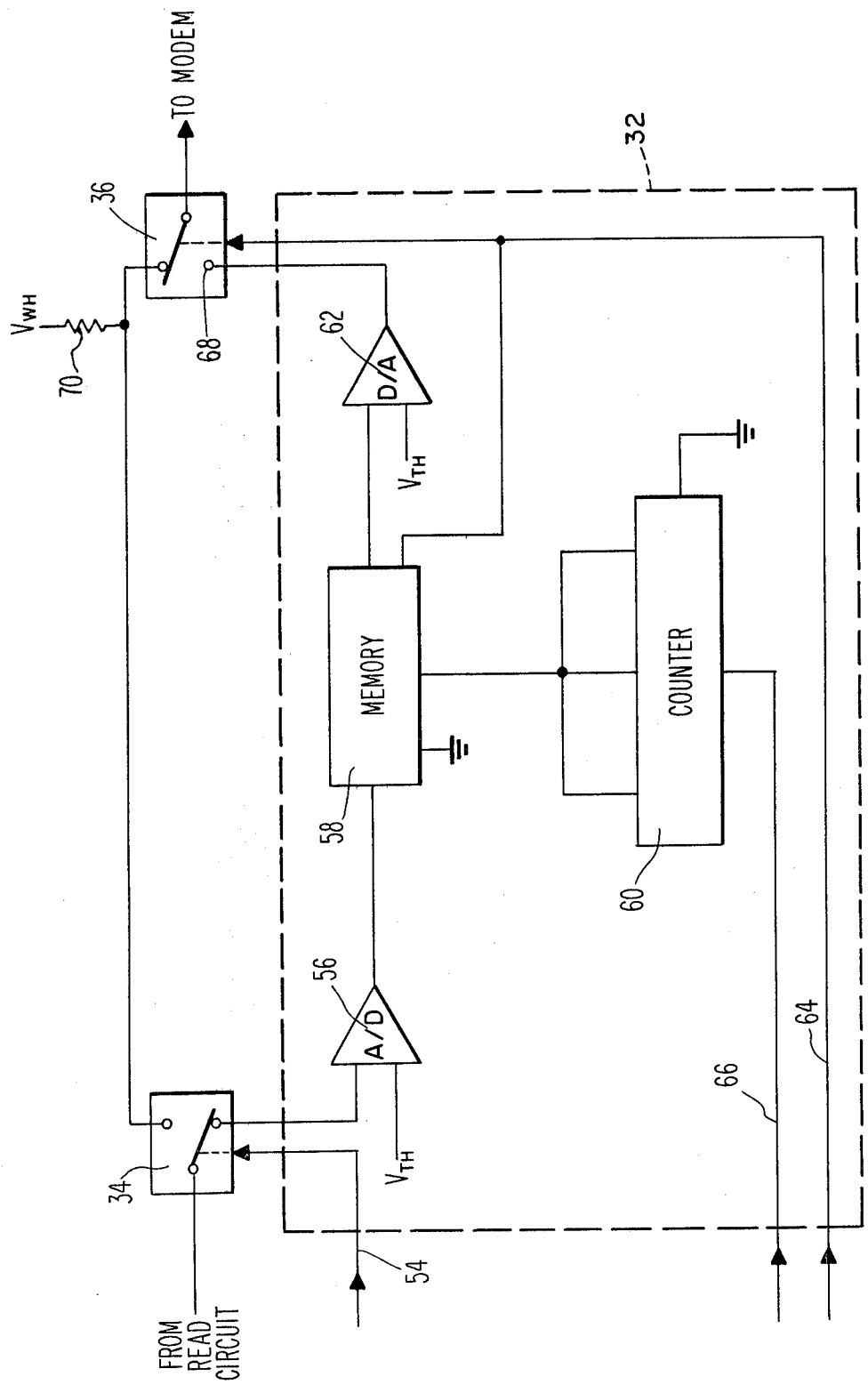
FIG. 2 is a circuit diagram of a self diagnostic circuit according to the present invention and useful in the transceiver shown in FIG. 1.

Referring now to FIG. 2, a self test circuit 32, according to the preferred embodiment of the present invention, will be described in detail. As seen in FIG. 2, the switch 34 is under the control of the microprocessor controller 24 by a signal on line 54.

When the switch 34 is in the position as shown in both FIG. 1 and FIG. 2, video signals from read circuitry 30 are directed to the self test circuitry 32. Self test circuit 32 comprises an analog-to-digital converter 56, a digital memory 58 under the control of a counter 60 and a digital-to-analog converter 62. Analog-to-digital converter 56 produces a digital output representing video signals from the read circuitry 30. In the situation in which only light/dark variations are transmitted, the analog-to-digital converter 56 is merely a comparator in which the video signals are compared against a threshold $V_{th}$ thereby producing a single bit binary output. However, in the case in which both light/dark variations as well as various shades of grey are transmitted, multibitbinary words from analog-to-digital converter 56 are directed to a digital memory 58 as shown. In the preferred embodiment, memory 56 is an 1K × 1 random access memory. During a portion of each revolution of drum 12, microprocessor controller 24 directs a write signal along line 64 to the memory 58. Moreover, the microprocessor controller 24 also includes a clock which directs clock pulses along line 66 to counter 60 which provide the digital memory 58 with a varying address signal for writing the incoming digitized video signal in a controller location in memory. During this portion of each drum revolution, i.e. during the period information is being written into memory, resistor 70 and voltage sound $V_{wh}$ insures that the transmitter means 38 or 40 detect a white signal to insure that the receiver section 44 does not detect and print dark/light variations. After the memory 58 is filled, which occurs normally after the drum 12 has made a revolution of for example, 180°, a signal from the microprocessor controller 24 also causes switch 36 to contact terminal 68. Thereafter, signals which have been retrieved from the memory 58 are passed through digital-to-analog converter 62 in which they are reconstituted to analog form and then passed through switch 36 to either AM modem 38 or FM modem 40 and from there through to AM/FM receiver 44. From AM/FM receiver 44, the demodulated signals are directed to stylus drive circuit 46 for ultimate application to the writing means 18.

While a particular embodiment of the present invention has been shown and described, it will, of course, be understood that various complications may be made without departing from the principals of the invention. The appended claims are, therefore, intended to cover any such modifications within the true spirit and scope of the invention.

What is claimed is:

1. A method of self-diagnostic testing a facsimile transceiver with a transmitter means and a receiver means and including a reading means and a writing means closely situated with respect to said reading means, said method comprising the steps of:

positioning a document having a test pattern on a first portion thereof adjacent said reading means;
  scanning a part of a single scan line of said document with said reading means said writing means being inactive during said scanning;
  selectively switching a memory to the output of said reading means during the period in which said part of said scan line is being scanned;
  storing the output of said reading means in said memory;

selectively switching the contents of said memory to said transmitter means the output of which is directed to said receiver means; and displaying the output of said receiver means on a second portion of said document with said writing means during another part of said single scan line said reading means being inactive during said displaying.

2. The method of claim 1 further comprising the step of:

repeating said scanning, storing, applying and displaying steps until all of said first portion is scanned and a facsimile displayed on said second portion.

3. The method of claim 1 further comprising the step of:

disconnecting the output of said transmitter means from a telephone network prior to said scanning step.

4. A method of testing a facsimile transceiver with a transmitter means and a receiver means, and including a reading means and a writing means closely situated with respect to said reading means, said reading and writing means being translatable along a path parallel to the axis of a rotatable drum, said method comprising the steps of:

positioning a document having a test pattern on a first portion thereof on the surface of said drum, said first portion encompassing only a part of the circumferences of said drum;

scanning said document with said reading means during a part of each drum revolution, said part corresponding to the passage of said reading means over a portion of said document, said writing means being inactive during said scanning;

selectively switching the output of said reading means to a memory during said part of each durm revolution;

storing the output of said reading means in said memory;

selectively switching the output of said memory to said transmitter means the output of which is directed to said receiver means; and displaying the output of said receiver means on a second portion of said document during a different part of that same drum revolution, said reading means being inactive during said displaying.

5. In a facsimile transceiver having a reading means, a transmitter means, a receiving means and a writing means closely situated with respect to said reading means, said transceiver having a self-test system, the improvement of said system comprising:

a means for holding a test document;

means to scan the test document with the reading means during part of each scan line;

memory means for storing the output of said reading means;

means for disabling said writing means during said storing; and switching means for selectively connecting the output of said memory means to said transmitter means the output of which is directed to said receiving means only when said self-test system is operative said writing means connected to said receiving means to display the output of said receiving means during a different part of the same scan line, said reading means being inactive during the display.

6. The improvement of claim 5 further comprising:

bypassing means for routing the output of said reading means around said memory means.

7. The improvement of claim 5 further comprising:

clock means; and counter means responsive to said clock means and connected to said memory means for storing the output of said reading means at a controlled location.

8. The improvement of claim 7 further comprising:

control means, said switching means being responsive thereto, for selectively connecting the output of said memory means to said transmitter means.

* * * * *